US006218661B1

(12) United States Patent
Schroeder et al.

(10) Patent No.: US 6,218,661 B1
(45) Date of Patent: *Apr. 17, 2001

(54) METHODS AND APPARATUS FOR MECHANICALLY ENHANCING THE SENSITIVITY OF TRANSVERSELY LOADED FIBER OPTIC SENSORS

(75) Inventors: Robert J. Schroeder, Newtown; Tsutomu Yamate, Brookfield; Rogerio T. Ramos, Bethel; Raghu Madhavan, Brookfield, all of CT (US); Eric Udd, Troutdale, OR (US)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/179,146

(22) Filed: Oct. 26, 1998

Related U.S. Application Data (63) Continuation-in-part of application No. 08/707,861, filed on Sep. 9, 1996, now Pat. No. 5,828,059, and a continuation-in-part of application No. 08/888,566, filed on Jul. 7, 1997, now Pat. No. 5,841,131.

(51) Int. Cl.[7] .................................................. G01J 1/04
(52) U.S. Cl. .................................. 250/227.14; 250/231.1
(58) Field of Search ...................... 250/227.18, 227.17, 250/227.14, 231.1; 385/37; 340/555–557

(56) References Cited

U.S. PATENT DOCUMENTS

| 4,659,923 | 4/1987  | Hicks, Jr. .............................. 250/227 |
| 5,380,995 | 1/1995  | Udd et al. ........................ 250/277.18 |
| 5,399,854 | 3/1995  | Dunphy et al. ....................... 250/227 |
| 5,469,520 | 11/1995 | Morey et al. ............................ 385/37 |
| 5,515,459 | 5/1996  | Farhadiroushan ...................... 385/12 |
| 5,591,965 | 1/1997  | Udd ................................. 250/227.18 |
| 5,841,131 | 11/1998 | Schroeder et al. ............... 250/277.17 |

FOREIGN PATENT DOCUMENTS

| 2 299 203  | 9/1996 | (GB) . |
| WO98/10242 | 3/1998 | (WO) . |
| WO98/31987 | 7/1998 | (WO) . |
| WO99/32863 | 1/1999 | (WO) . |

OTHER PUBLICATIONS

Article by Xu et al. entitled "Fiber Grating Pressure Sensor with Enhanced Sensitivity Using a Glass–Bubble Housing", Electronics Letters, Jan. 18, 1995, vol. 32, No. 2, pp. 128–129.

Article by Xu, entitled "Optical In–Fibre Grating High Pressure Sensor", Electronics Letters, Feb. 18, 1993, vol. 29, No. 4, pp. 398–399.

Article by Morey entitled "Distributed Fiber Grating Sensors", Published Dec., 1990.

Article by Jansen et al., entitled "High Pressure Fiber–optic Sensor with Side–Hole Fiber", SPIE vol. 798 Fiber Optic Snensors II, 1987, pp. 56–60, (Month Unknown).

*Primary Examiner*—Que T. Le
(74) *Attorney, Agent, or Firm*—William B. Batzer; David P. Gordon (57) ABSTRACT

The apparatus of the present invention include an optical fiber with a Bragg grating formed along a portion of its core and a mechanical structure arranged adjacent to the Bragg grating for amplifying transverse strain on the fiber in the vicinity of the grating. In particular, the mechanical structure is designed to convert ambient pressure into transverse strain on the fiber in the vicinity of the grating. The methods of the invention include converting pressure into transverse strain on an optical fiber, amplifying the effect of pressure on the transverse strain, measuring pressure by determining the spacing between spectral locations related to peaks (or minimums) of light reflected from an optical grating subjected to transverse strain, and measuring the temperature of the grating by determining the locations of the spectral locations related to the peaks (or minimums) of light reflected from the grating. According to one embodiment, the mechanical structure includes a piston mounted in a transducer body through which the optical fiber passes.

32 Claims, 7 Drawing Sheets

METHODS AND APPARATUS FOR MECHANICALLY ENHANCING THE SENSITIVITY OF TRANSVERSELY LOADED FIBER OPTIC SENSORS

This application is a continuation-in-part of application Ser. No. 08/707,861, entitled "Transverse Strain Measurements Using Fiber Optic Gratings Based Sensors", filed Sep. 9, 1996, now U.S. Pat. No. 5,828,059 and a continuation-in-part of co-pending application Ser. No. 08/888,566, entitled "Fiber Optic Pressure Transducer and Pressure Sensing Systems", filed Jul. 7, 1997, now U.S. Pat. No. 5,841,131, the complete disclosures of which are hereby incorporated by reference herein.

BACKGROUND OF THE INVENTION

1. Field of the Invention

The invention relates to fiber optic sensors. More particularly, the invention relates to methods and apparatus for mechanically enhancing the sensitivity of transversely loaded fiber optic sensors and for converting pressure to transverse strain on a fiber optic sensor.

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam travelling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam travelling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagation of light through a wave guide (optical fiber) assume an "ideal" wave guide, i.e. a straight wave guide with perfect symmetry and no imperfections. For example, the diameter of the core will determine whether the fiber optic is "single mode" or "multimode". The terms single mode and multimode refer to the dimensional orientation of rays propagating through the fiber. Single mode fibers have a core with a relatively small diameter (2–12 microns) and support only one spatial mode of propagation. Multimode fibers have a core with a relatively large diameter (25–75 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing circular core with a cladding which induces stress on the core. For example, the cladding may be provided with two parallel stress members having longitudinal axes which lie in the same plane as the axis of the core.

As mentioned above, fiber optic sensors employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic pressure sensor takes advantage of the fact that ambient pressure places a strain on the jacket of an optical fiber which strains the cladding, thereby straining the core and changing the birefringence of the fiber. U.S. Pat. No. 4,659,923 to Hicks, Jr. discloses a fiber optics interferometer transducer which is capable of measuring pressure. The device generally includes a single mode fiber optic, a light source, a first polarizer, a second polarizer, and a light intensity detector. The first polarizer is used to polarize the light source to an angle which is 45° to the two modes of the fiber optic, whereafter the light is injected into one end of the fiber. The second polarizer is arranged at the other end of the fiber and polarizes light exiting the fiber to the same angle as the first polarizer before it is detected by the intensity detector. When a force is applied transversely to the fiber, the birefringence of the fiber changes, which changes the beat length and thus the intensity of the polarized light viewed by the intensity detector. In an alternative embodiment, a beam splitter is placed between the light source and the first polarizer, and the second polarizer is replaced by a mirror coupled to the second end of the fiber optic. According to the alternative embodiment, the detector and the source may be located at the same end of the fiber optic. No data is provided regarding the sensitivity (resolution) or dynamic range of the proposed sensors. However, it is suggested that the effects of pressure on birefringence may be too small to measure at relatively low pressures. Various structures are disclosed for mounting the fiber such that isotropic forces are converted to anisotropic forces to produce birefringence and to magnify the effect. One of the structures used for this purpose is suggested by the '923 patent and disclosed in greater detail by Jansen and Dabkiewicz in an article entitled "High Pressure Fiber Optic Sensor with Side Hole Fiber", published in SPIE Proceedings, Fiber Optic Sensors II, Vol. 798, pp. 56–60, 1987. Side hole fiber is a fiber optic having a cladding which contains two parallel holes which run the length of the fiber and are parallel to the core. The axes of the holes and the core lie in a common plane. This geometry results in converting external hydrostatic pressure into anisotropic stress at the core thereby inducing birefringence. Jansen and Dabkiewicz demonstrate a sensor having an accuracy of ±0.5% in the pressure range of 100–1,000 bars (10–100 MPa, 1,450–14,500 psi) and an upper limit of 2,000 bars without fiber failure. Below 100 bars, however, birefringence tends to become undetectable or nonexistent.

Another type of fiber optic sensor utilizes intra-core fiber gratings as disclosed in U.S. Pat. No. 5,380,995 to Udd et al., the complete disclosure of which is incorporated by reference herein. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired.

U.S. Pat. No. 5,380,995 to Udd et al. teaches the use of a remote grating which is located to sense an environmental effect such as strain or temperature and a local grating which is located to be unaffected by the environmental effect. The spectral envelopes of both gratings are compared and the effects of strain and temperature on the remote grating can thereby be separated. The '995 patent also teaches the use of two overlaid fiber gratings of different wavelengths such as 1.3 and 1.5 microns to measure two environmental effects such as strain and temperature at a single point.

Still another way to separate the effects of strain and temperature is disclosed in U.S. Pat. No. 5,591,965 to Udd, the complete disclosure of which is fully incorporated by reference herein. The '965 patent teaches the use of a pair of gratings written in substantially the same location in a birefringent fiber. When a birefringent fiber is provided with a grating, two spectral peaks are produced (one for each polarization axis) and temperature and longitudinal strain changes affect the peak to peak separation as well as the wavelength shift of the peaks. As taught in the '965 patent, a birefringent fiber provided with two spectrally separated gratings produces four spectral outputs (peaks). Spectral detectors such as Fabry-Perot etalons coupled to the fiber detect the four spectral outputs. The spectral outputs are analyzed and four equations are solved to determine both the temperature and the strain effects on the fiber.

While neither '995 nor the '965 patent specifically refers to pressure sensors, it has been demonstrated that an ultrahigh hydrostatic pressure induces fractional changes in the physical length of a fiber optic and thus induces a fractional change in the Bragg wavelength of a grating incorporated in the fiber core. For example, M. G. Xu et al., Optical In-Fibre Grating High Pressure Sensor, Electron. Lett., Vol. 29, No. 4, pp. 398–399 (1993), demonstrates how a fiber optic Bragg grating sensor can be used to measure very high pressure. In particular, the Xu et al. paper demonstrates a simple in-fiber grating sensor which exhibits a linear Bragg wavelength shift of $3.04 \times 10^{-3}$ mm/MPa. The authors specifically state that far more compensation for the effects of temperature is necessary for their sensor to be valuable and that the real advantage of their sensor is only evident at ultrahigh pressure.

3. Related Inventions

Parent application Ser. No. 08/707,861, entitled "Transverse Strain Measurements Using Fiber Optic Gratings Based Sensors", filed Sep. 9, 1996, now U.S. Pat. No. 5,828,059 discloses a system and method for sensing the application of transverse stress to an optical fiber having an optical grating in its core. When the fiber is coupled to a light source and the optical grating is transversely stressed, the grating produces a reflection or transmission that has two peaks (or two minimums) in its frequency spectrum and the spectral spacing between the peaks (or minimums) is indicative of the transverse force applied to the fiber. The spectral spacing between the peaks (or minimums) is substantially unaffected by temperature. In addition, the spectral location of the two peaks (or minimums) can be used to calculate the temperature of the grating. Optical fibers with multiple gratings are also disclosed wherein simultaneous measurements of temperature and pressure may be made at different locations along the length of a fiber. According to one embodiment, fiber gratings are written into circularly symmetric single mode optical fiber. The advantages of this embodiment is that low cost telecommunications grade optical fiber can be used and the symmetry of the fiber results in transverse sensitivity which is independent of the loading direction. A disadvantage of this embodiment is that for small transverse loads, the peak to peak separation may be extremely difficult to measure as the peaks may be buried in noise.

Parent application Ser. No. 08/888,566, entitled "Fiber Optic Pressure Transducer and Pressure Sensing Systems filed Jul. 7, 1997, now U.S. Pat. No. 5,841,131 discloses a fiber optic pressure transducer having enhanced resolution and dynamic range which includes a fiber optic core having one or more gratings written onto it, a birefringence structure for enhancing the birefringence of the core, and a structure for converting isotropic pressure forces to anisotropic forces on the fiber core. Several different embodiments of prestressing structure are disclosed (both extrinsic and intrinsic). Several different embodiments of structure (both extrinsic and intrinsic) for converting isotropic pressure to anisotropic pressure are also disclosed.

While many advances have been made in improving fiber optic sensors, the sensitivity and dynamic range of strain and particularly pressure sensors is still limited to resolving relatively large changes in relatively large forces.

SUMMARY OF THE INVENTION

It is therefore an object of the invention to provide methods and apparatus for enhancing the sensitivity of fiber optic sensors.

It is also an object of the invention to provide methods and apparatus for enhancing the sensitivity of transversely loaded fiber optic sensors.

It is another object of the invention to provide methods and apparatus for mechanically enhancing the sensitivity of transversely loaded fiber optic sensors.

It is an additional object of the invention to provide methods and apparatus for mechanically enhancing the sensitivity of transversely loaded fiber optic sensors which may be applied to different types of optical fibers with or without other intrinsic or extrinsic enhancements.

A further object of the invention is to provide methods and apparatus for measuring pressure and temperature simultaneously with a single transversely loaded fiber optic sensor.

Another object of the invention is to provide a fiber optic sensor which provides a pressure determination which is substantially temperature insensitive, and which can be compensated by a temperature determination.

An additional object of the invention is to provide a fiber optic pressure sensor which has the advantages of a transversely loaded fiber optic strain sensor.

In accord with these objects which will be discussed in detail below, the methods and apparatus of the present invention include an optical fiber with a Bragg grating formed along a portion of its core and a mechanical structure arranged adjacent to the Bragg grating for optimizing transverse strain on the fiber in the vicinity of the grating. In particular, the mechanical structure is designed to convert pressure on the mechanical structure into transverse strain on the fiber in the vicinity of the grating.

The methods of the invention include converting pressure on a mechanical structure into transverse strain on an optical fiber, amplifying the effect of the pressure on the transverse strain, measuring the pressure by determining the spacing between spectral locations related to spectral peaks (or minimums) of light reflected from an optical grating subjected to transverse strain, and measuring the temperature of the grating by determining the spectral locations related to the peaks (or minimums) of light reflected from the grating.

According to a first embodiment, the mechanical structure includes a piston mounted in a transducer body through which the optical fiber passes. The piston may be cylindrical and may include a stepped diameter with a portion exposed to pressure forces sought to be measured having a first diameter $d_1$, and a portion lying adjacent to the portion of the optical fiber wherein the grating resides having a second diameter $d_2$. Preferably, the piston is separated from the optical fiber by a first glass or quartz plate, and a second glass or quartz plate underlies the optical fiber. The transverse strain exerted on the fiber by the piston (via the glass plate) as compared to the force to be measured which is exerted on the portion exposed portion the piston can be shown to be proportional to $d_1^2/d_2$. More particularly, the transverse strain exerted on the fiber grating is amplified in proportion to the ratio of the surface area of the portion of the piston exposed to the environment and the contact area between the fiber and the glass or quartz plate. According to this embodiment, the portion of the transducer body surrounding the portion of the piston touching the glass plate and the optical fiber wherein the grating resides is isolated from the pressure being measured, either by a tight fit of the piston with the surface tension of oil in the piston cylinder or by mounting a diaphragm atop the exposed portion of the piston and sealing the edge of the diaphragm relative to the transducer body. If desired, two substantially identical optical fibers may be placed between the glass or quartz plates in order to provide mechanical stability, although only one fiber need be used for sensing.

According to a second embodiment, the mechanical structure includes two semi-cylindrical rods and a flexible sheath. The optical fiber is placed between the rods and the rods are covered with the flexible sheath. Preferably, two substantially identical optical fibers are placed between the rods in order to provide mechanical stability, although only one fiber need be used for sensing.

According to a third embodiment, an optical fiber is enclosed in a micro-machined chamber made of silicon, for example. The transverse force on the fiber as compared to the force exerted on the exterior of the chamber depends on the material of the chamber and its dimensions.

According to a fourth embodiment, an optical fiber is enclosed in an elliptical tube with a filling material having a low Young's modulus.

According to a fifth embodiment, an optical fiber is enclosed in a chamber made of quartz plates. A bottom plate has a longitudinal concave well between two planar shoulders. The optical fiber is placed in the well and a planar quartz or glass diaphragm is placed over the bottom plate covering the groove and contacting the fiber. The quartz or glass plates are mounted in an assembly and a seal is applied to isolate the well from the ambient pressure.

According to a sixth embodiment, a transducer is comprised of a micro-capillary quartz or glass tube having a hole through which the fiber extends. The hole may be rectangular or ellipsoid. If the hole diameter is made smaller than the fiber diameter, the fiber can be installed during a heating process which increases the hole diameter. After cooling, the fiber will be pre-loaded.

In all of the embodiments, the portion of the optical fiber which is subjected to the transverse strain may have its jacket removed. The cladding of the fiber at that portion may be covered by a relatively non-deforming coating made from, e.g., carbon, silicon-carbide, polyimide, etc. Alternatively, the cladding of the fiber at that portion may be exposed. When exposed, it is preferable that the chamber be sealed and that a non-reactive gas environment be provided to prevent fiber degradation.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
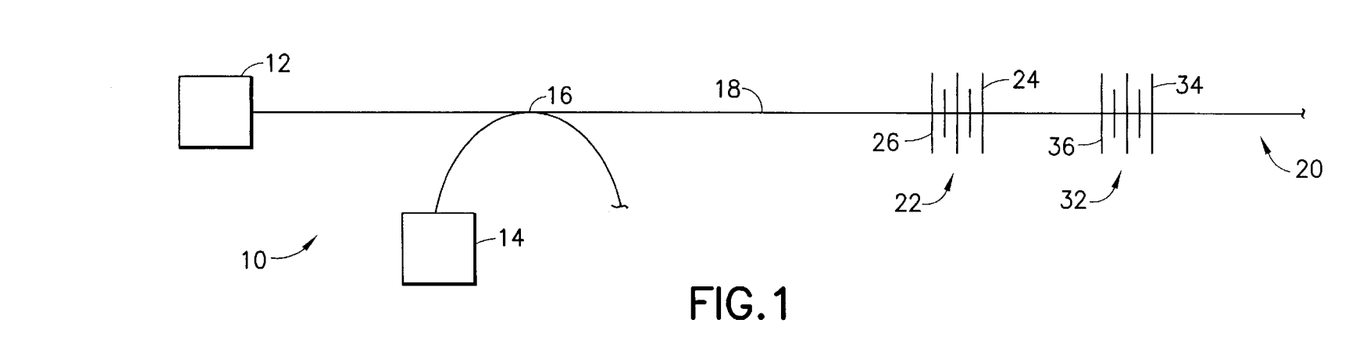
FIG. 1 is a schematic view of a fiber optic pressure/strain sensing system according to the invention.

Referring now to FIG. 1, an exemplary fiber optic pressure/strain sensing system 10 according to the invention generally includes a light source 12, a spectral analyzer 14, a fiber beam splitter 16, an optical fiber 18, a low back reflection terminator 20, and one or more birefringent fiber optic pressure transducers 22 (32, etc.) each having one or more gratings 24, 26 (34, 36, etc.). The light source 12 may be, e.g. an LED, a tunable laser, a laser diode, or a broadband erbium doped fiber. It is advantageous to use a relatively broad spectrum source which will permit the application of multiple gratings of different wavelength. The spectral analyzer 14 may be a Fabry-Perot etalon, an acoustic-optical device, a Michelson interferometer, a Mach-Zehnder interferometer, or another type of known device. The back reflection terminator 20 may be of the type disclosed in U.S. Pat. No. 4,834,493 to Udd et al. The number of transducers and the number of gratings in each transducer is not critical so long at there is at least one transducer with one grating.

Figure 2:
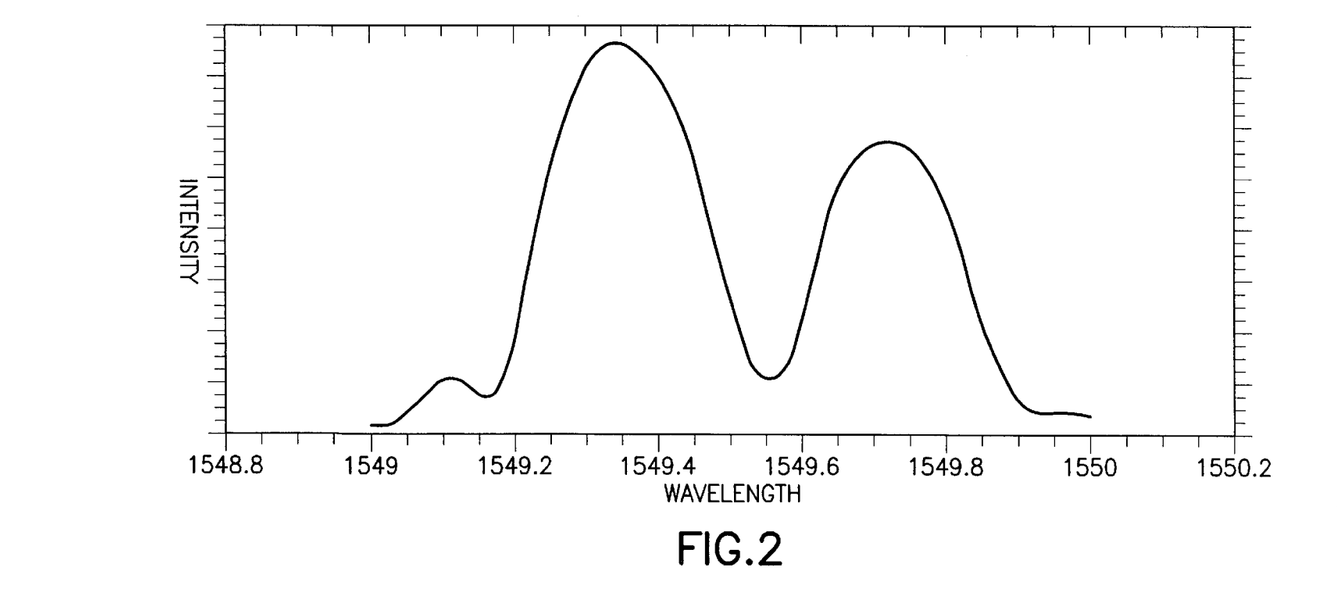
FIG. 2 is a plot illustrating the spectral content of light reflected from a single Bragg grating subjected to transverse strain.

According to the invention, the fiber optic pressure transducer(s) 22 (32) is (are) also provided with novel structure which produces enhanced sensitivity and dynamic range as described in more detail below with reference to FIGS. 3–13. The components of the sensing system 10 are arranged substantially as shown in FIG. 1. The light source 12 directs a beam through the beam splitter 16 into the optical fiber 18 such that light enters one end of the fiber optic pressure transducer 22. A spectral portion of the light is reflected back by the grating(s) 24, 26 (34, 36) to the beam splitter 16 which directs the reflected beam onto the spectral analyzer 14. The other output end of the beam splitter 16 may be directed to another set (or sets) of Bragg gratings and pressure transducers (not shown), and if desired, multiple beam-splitters can be utilized with one or more sets of gratings on each fiber. In addition, the sensing system can be operated in a reflection mode as shown, or in a transmission mode with the spectral analyzer 14 located where the reflection terminator 20 is presently shown. Regardless, depending on the number of different gratings provided on the fiber(s), the spectral analyzer will detect one or more pairs of spectral peaks as shown in FIG. 2. The wavelength of the peaks and their shift relative to each other will change based on the temperature of and transverse strain on the grating respectively. FIG. 2 illustrates the spectral content of light reflected from a single Bragg grating in a PM fiber. According to the invention, the transverse strain on the fiber grating is related to pressure on the transducer.

Figure 3A:
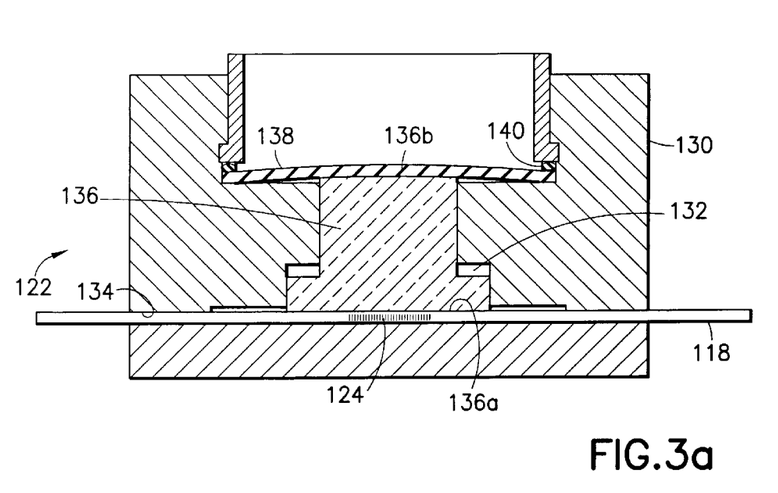
FIGS. 3a and 3b are a schematic sectional views of alternate first embodiments of an apparatus for mechanically enhancing the sensitivity of a transversely loaded fiber optic sensor.

Turning now to FIG. 3a, a first embodiment of a transducer 122 according to the invention includes a transducer body or block 130 defining a piston cylinder cavity 132 and an intersecting orthogonal fiber optic passage 134. An optical fiber 118 with a grating 124 is disposed in the passage 134 with the grating preferably located adjacent the piston cylinder cavity 132. According to the invention, although the jacket of the optical fiber 118 may be left intact in the transducer, in the preferred embodiment, the portion of the fiber 118 residing in the cylinder cavity 132 has its jacket removed and replaced by a relatively non-deforming coating made from, e.g., carbon, silicon-carbide, polyimide, etc. Alternatively, the cladding of the fiber at that portion may be exposed. When exposed, it is preferable that the chamber be sealed and that a non-reactive gas environment be provided to prevent fiber degradation. A piston 136 (preferably made of glass, quartz, or metal) is disposed in the piston cylinder cavity 132 with the bottom 136a of piston 136 resting on top of the fiber 118 and the top 136b of the piston 136 extending out of the cylinder 132. A flexible diaphragm 138 with a sealing gasket 140 is placed over the top 136b of the piston 136. This arrangement maintains near atmospheric pressure inside the cylinder 132 so that the only force acting on the grating 124 is the transverse strain imparted by the piston 136. Alternatively, the diaphragm and sealing gasket may be omitted where a seal is maintained by a tight fit between the piston and the cylinder with the surface tension of lubricating oil forming a seal.

Figure 3B:
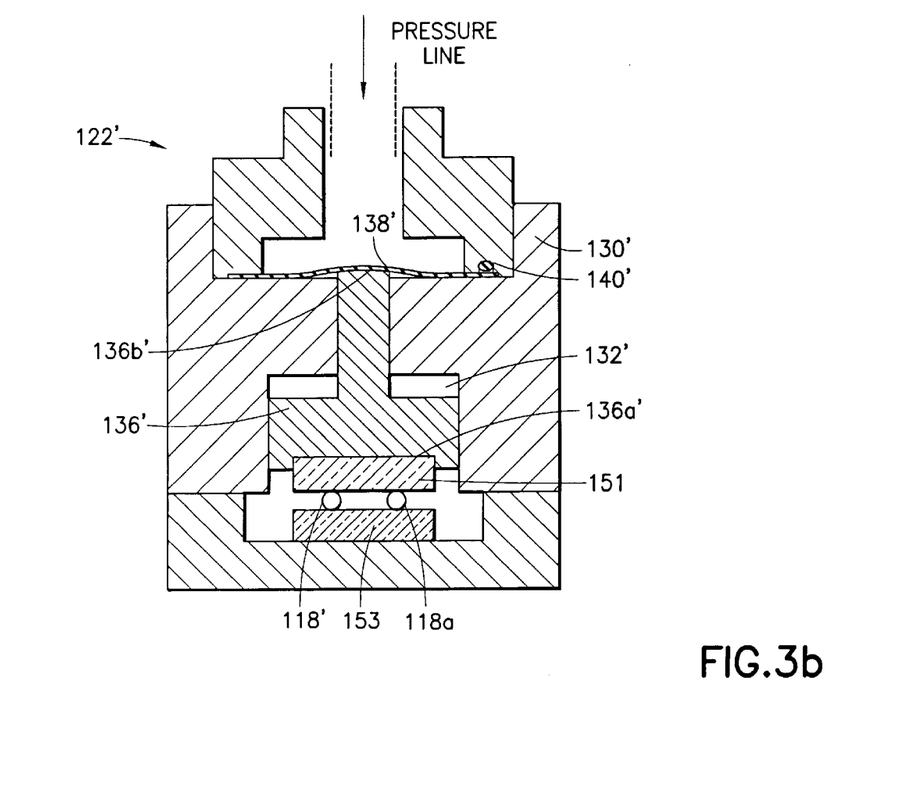

An alternative first embodiment is seen in FIG. 3b (where primed numerals indicate like parts to the embodiment of FIG. 3a). Transducer 122' includes a transducer body 130' defining a cavity 132'. An optical fiber 118' with a grating is disposed in the cavity. As in the embodiment of FIG. 3a, the jacket of the optical fiber 118' may be left intact in the transducer, may be removed to expose the cladding, or may be removed and replaced by a relatively non-deforming coating. A piston 136', and glass plates 151 and 153 are disposed in the cavity 132'. The optical fiber 118' is located between the glass plates 151 and 153, and a second fiber or wire 118a of diameter similar to the diameter of the fiber 118' is also located between the glass plates and spaced from the fiber 118' in order to stabilize the plates (i.e., prevent rocking). The bottom 136a' of piston 136' is set on top of the glass plate 151, and the top 136b' of the piston 136' extends out of the cavity 132'. A flexible diaphragm 138' with a sealing gasket 140' is placed over the top 136b' of the piston 136'. This arrangement maintains near atmospheric pressure inside the cavity 132' so that the only force acting on the fiber grating is the transverse strain imparted by the piston 136'.

According to the embodiments of FIGS. 3a and 3b, the piston 136 (136') may have a stepped diameter for purposes of controlling the application of pressure to the fiber. Thus, as seen in FIG. 3a, a smaller diameter portion $d_1$ of the piston is exposed to pressure forces sought to be measured and a larger diameter part $d_2$ is provided adjacent to the portion of the optical fiber wherein the grating resides. The transverse strain exerted on the fiber is proportional to $d_1^2/d_2$. More particularly, the transverse strain exerted on the fiber grating is amplified in proportion to the surface area of the portion of the piston exposed to the environment as compared to the fiber/piston (in FIG. 3a) or fiber/plate (in FIG. 3b) contact area.

Figure 4:
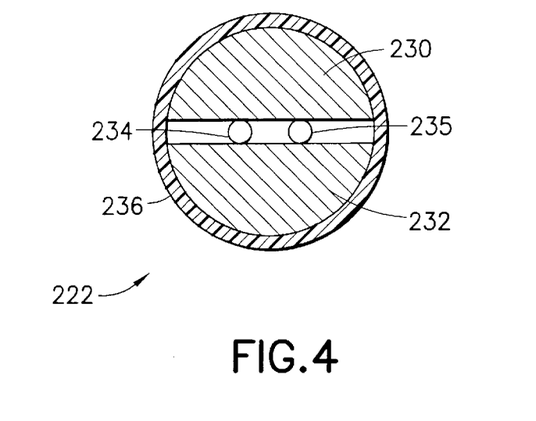
FIG. 4 is a schematic sectional view of a second embodiment of an apparatus for mechanically enhancing the sensitivity of a transversely loaded fiber optic sensor.

Turning now to FIG. 4, a second embodiment of a transducer 222 according to the invention includes two semi-cylindrical rods 230, 232 and a flexible sheath 236. The flexible sheath 236 may either be relatively soft, or may be relatively hard but sufficiently thin to transmit force therethrough. A portion of the optical fiber 234 (preferably with its jacket removed and its cladding either exposed or covered with a hard, hermetic, substantially non-deforming coating) is placed between the rods 230, 232 and the rods are covered with the sheath 236. Preferably, a second substantially identical optical fiber 235 is placed between the rods 230, 232 spaced slightly apart from the fiber 236 in order to provide stability, although only the fiber 236 need be used for sensing. Those skilled in the art will appreciate that the rods 230, 232 are preferably made from a material having the same physical properties (with regard to pressure, temperature, etc.) as the optical fiber cladding. A suitable material for the sheath 236 is TEFLON™, a thin quartz, or a thin ceramic. The pressure exerted on the outer surface of the sheath is translated by the rods to a transverse strain on the fibers. The relationship between the pressure and the transverse strain is proportional to the integrated surface area of the rods as compared to the area of contact on the sensing fiber.

Figure 5:
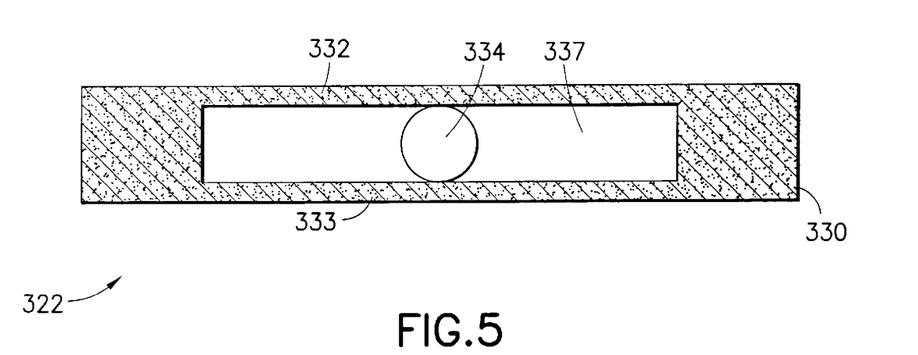
FIG. 5 is a schematic sectional view of a third embodiment of an apparatus for mechanically enhancing the sensitivity of a transversely loaded fiber optic sensor.

A third embodiment of the invention is illustrated in FIG. 5. The transducer 322 includes an optical fiber 334 having a portion with Bragg gratings enclosed in a chamber 330. The portion enclosed in the chamber preferably has its jacket removed and replaced with a hard, hermetic, substantially non-deforming coating. Alternatively, if the jacket is removed and the cladding exposed, the chamber is filled with a non-reactive gas and hermetically sealed. The chamber 330 has two thin walls 332, 333 which act as flexible diaphragms (such as those used in microelectricalmechanical structures (MEMS), or micro-opticalelectricalmechanical structures (MOEMS)) surrounding the space 337 containing the fiber 334. The transverse force on the fiber as compared to the ambient force exerted on the exterior of the chamber depends on the material of the chamber and its dimensions. Silicon is a suitable material for a MEMS or MOEMS type chamber although other materials can be used.

Figure 6:
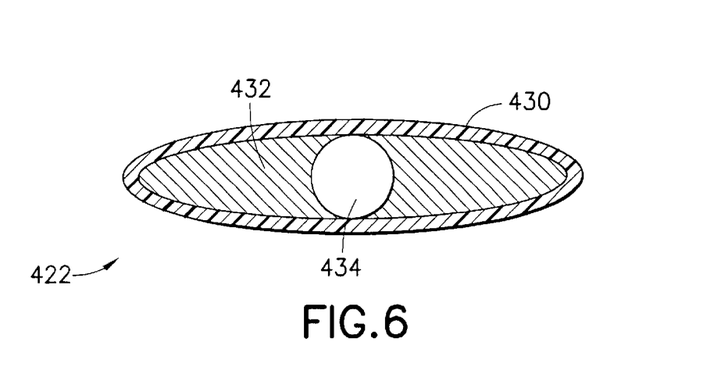
FIG. 6 is a schematic sectional view of a fourth embodiment of an apparatus for mechanically enhancing the sensitivity of a transversely loaded fiber optic sensor.

According to a fourth embodiment, illustrated in FIG. 6, the transducer 422 includes an elliptical tube 430 filled with a filling material 432 covering a portion of the optical fiber 434 having a Bragg grating. The optical fiber portion located in the tube 430 preferably has its jacket replaced with a hard, hermetic, substantially non-deforming coating, although the cladding may be exposed if desired. The tube 430 is made of a material suitable for exposure to high pressure and temperature and the filling material 432 preferably has a low Young's modulus.

Figures 7A, 7B:
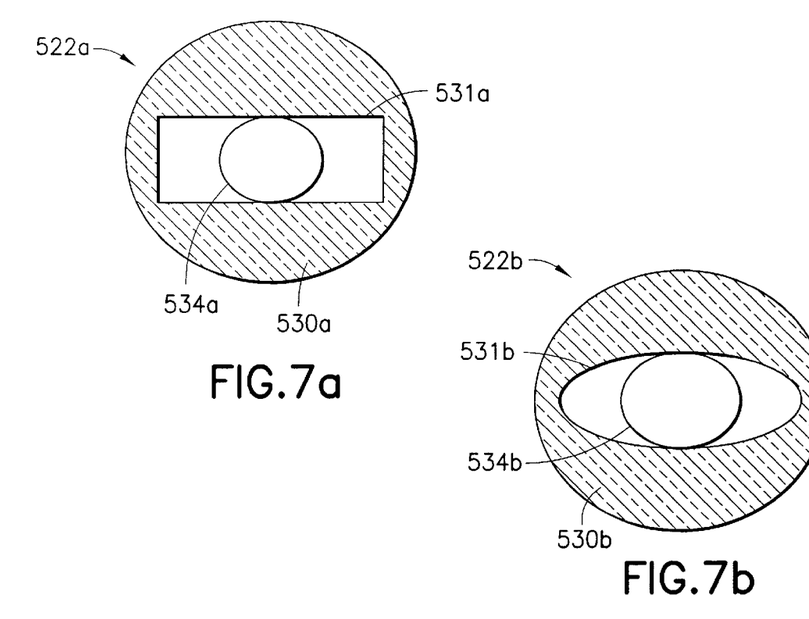
FIGS. 7a and 7b are schematic sectional views of a fifth embodiment of an apparatus for mechanically enhancing the sensitivity of a transversely loaded fiber optic sensor.

Alternate fifth embodiments of the invention are seen in FIGS. 7a and 7b. In both embodiments, the transducers 522a, 522b comprise preferably a quartz or glass microcapillary tube 530a, 530b having a hole or chamber 531a, 531b. In FIG. 7a, a cross-section through the chamber 531a forms a rectangle, whereas in FIG. 7b, a cross-section through the chamber 531b forms an ellipse. In both cases, the optical fiber 534a, 534b extends through the chamber and has a diameter which is preferably slightly larger than the "diameter" of the chamber 531a, 531b, thereby causing the fiber to be pre-loaded. This may be accomplished is manufacture by installing the fiber into the chamber during a heating process while the hole diameter is increased by heating the micro-capillary tube. If desired, the jacket of the portion of the fiber located in the chamber is removed; and if desired, replaced with a hard, hermetic, substantially non-deforming coating. The chamber is preferably filled with air or inert gas, although a stable glass material may also be utilized.

Figure 8:
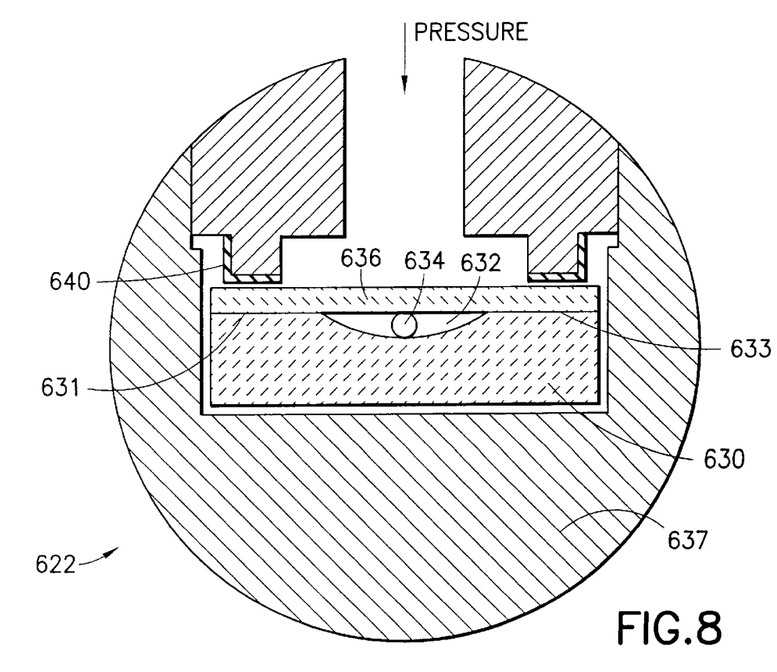
FIG. 8 is a schematic sectional view of a sixth embodiment of an apparatus for mechanically enhancing the sensitivity of a transversely loaded fiber optic sensor.

A sixth embodiment of the invention, illustrated in FIG. 8 includes a transducer 622 having a chamber made of quartz plates 630, 636 between which the optical fiber 634 is placed. A bottom quartz plate 630 is configured to have a longitudinal concave well 632 between two planar shoulders 631, 633. The optical fiber 634 (preferably with cladding exposed) is placed in the well 632 and a planar quartz diaphragm 636 is placed over the bottom plate 630 covering the groove and contacting the fiber. The quartz plates are mounted in an assembly 637 and a seal 640 is applied to isolate the well from the ambient pressure. The advantages of this embodiment include fewer number of parts, the ability to miniaturize the assembly, and the ability to preload the fiber.

As mentioned briefly above, according to the invention, many different types of optical fiber may be used. Such fibers include those described in the parent applications and include fibers having side holes, fibers without side holes, fibers which incorporate various birefringence enhancing structures, and polarization-maintaining (PM) fibers.

Figure 9:
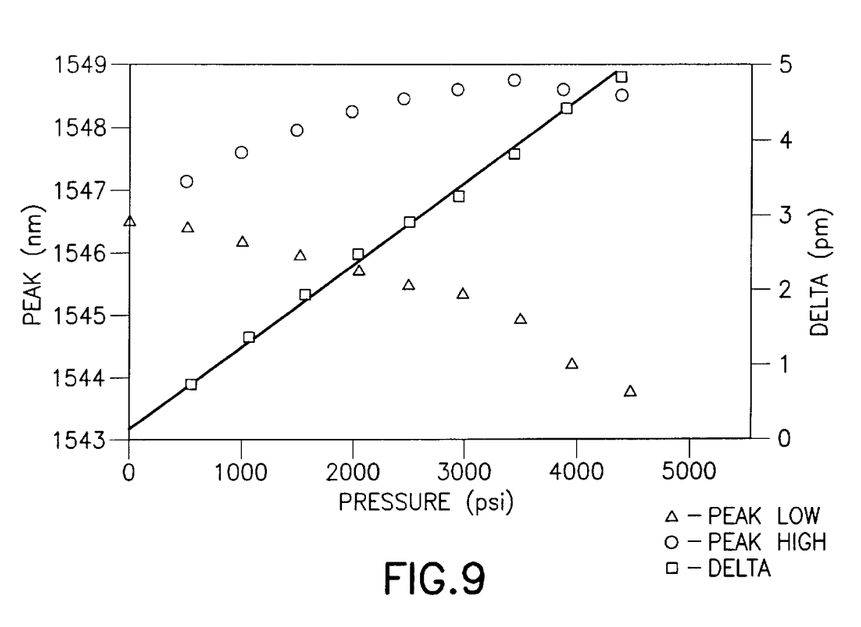
FIG. 9 is a plot correlating pressure and wavelength in a side hole fiber using a prototype of the first embodiment of the invention.

A prototype of the first embodiment of the invention described above with reference to FIG. 3b was built and tested. The prototype transducer built was a cylinder approximately 3.5" tall containing a metal piston with $d_1$ approximately 0.25" and $d_2$ approximately one inch, and two one-inch square quartz or galss plates. Two fibers were placed under the glass plate under the piston in separate experiments: a side hole fiber and a standard fiber. Each fiber was provided with a single Bragg grating located in a portion of fiber having exposed cladding under the piston, and each fiber was coupled to a light source and spectral detector as described above with reference to FIG. 1. The transducer was exposed to different pressures in the range of 500 to 5000 psi. Pressures were measured with a Quartzdyne™ gauge and the spectral location of peaks was recorded for each pressure. FIG. 9 illustrates the wavelengths of the low and high peaks for each pressure measured as well as the Δwavelength for each pair of peaks as recorded from the side hole fiber.

As seen in FIG. 9, at zero psi both beaks are found at approximately 1546.6 nanometers. At approximately 1,500 psi, the high peak is found at approximately 1548 nanometers and the low peak is found at approximately 1546 nanometers. Using side hole fiber the wavelength of the high peak continues to rise with rising pressure and the wavelength of the low peak continues to drop with rising pressure as shown in FIG. 9. The difference between the wavelength of the high peak and the low peak is also seen to increase with increasing pressure. This difference between the peak wavelengths (Δnanometers) is shown in FIG. 9 to be linearly related to pressure. From the experimental results, it was also seen that the sensitivity to pressure using the prototype transducer with side hole fiber was approximately one psi per picometer (stated inversely, one picometer change in wavelength per one psi change in pressure).

Figure 10:
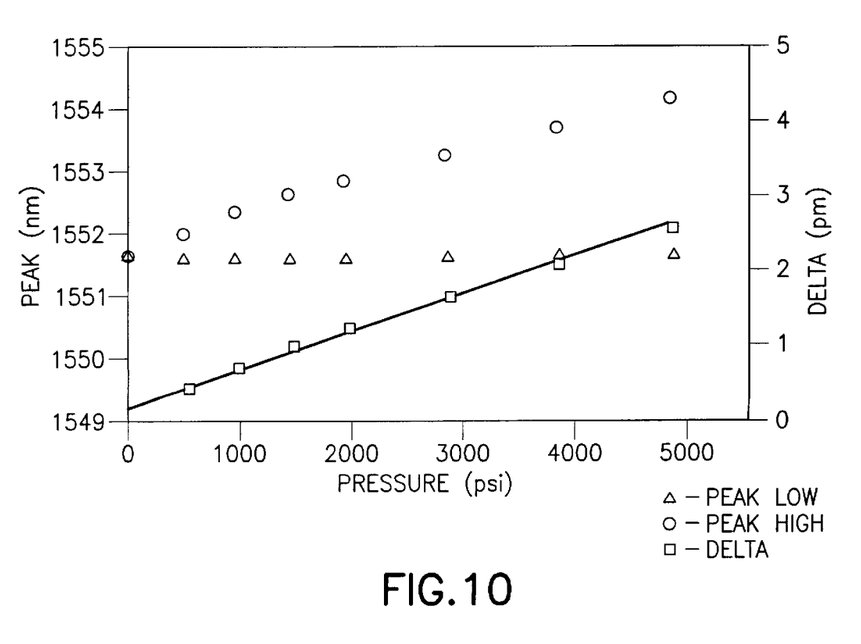
FIG. 10 is a plot correlating pressure and wavelength in a standard fiber using a prototype of the first embodiment of the invention.
Figure 11:
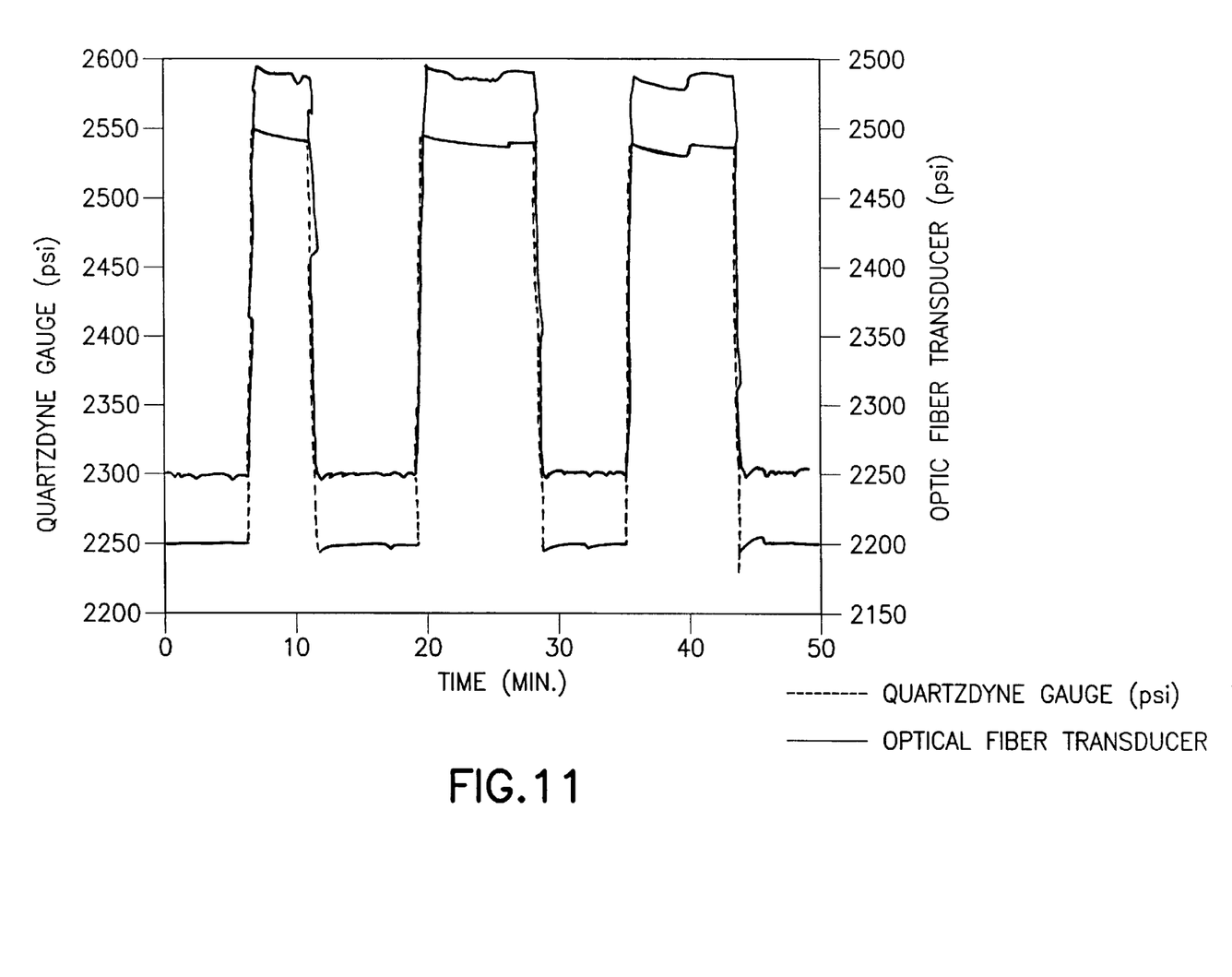
FIG. 11 is a plot illustrating dynamic measurement accuracy of the prototype as compared to a Quartzdyne™ gauge.

Similar results are shown in FIG. 10 where using the prototype transducer with standard fiber produced a sensitivity of approximately two psi per picometer (stated inversely, one half picometer change in wavelength per one psi change in pressure). The lesser sensitivity is clearly due in significant part to the lack of change in the lower peak exhibited by the standard fiber as compared to the side hole fiber. In either case, the prototype transducer produced markedly superior results compared to a state of the art fiber optic Bragg grating pressure sensor which has a sensitivity of only 33 psi/pm (stated inversely 0.033 picometers change in wavelength per one psi change in pressure).

Subsequent to calibration with experimental data such as those illustrated in FIG. 9, the transducer was subjected to repeated 300 psi pressure steps over the course of 50 minutes, each step having a duration of 5–10 minutes. A Quartzdyne™ gauge measured the same pressure steps for comparison. The measurements obtained by the prototype transducer and the Quartzdyne™ gauge are plotted side by side (offset by 50 psi for clarity) in FIG. 10. It was determined that the prototype transducer produced a resolution of approximately 0.4 psi (calculated) which compared favorably to the Quartzdyne™ gauge resolution of 0.01 psi. With a great deal of statistical certainty, the differences between the pressures indicated by the prototype transducer and the pressures indicated by the Quartzdyne™ gauge were approximately ±4 psi, and the static repeatability of measurements made with the prototype transducer was within ±0.5 psi.

Figure 12:
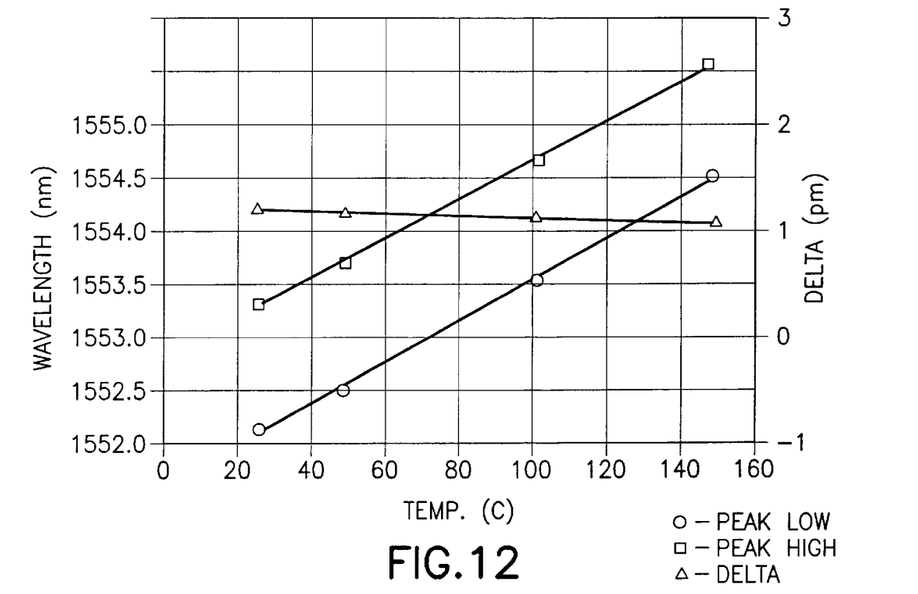
FIG. 12 is a plot illustrating the negligible effects of temperature on measurements made with the prototype and also illustrates how temperature may be simultaneously measured when pressure is measured.
Figure 13:
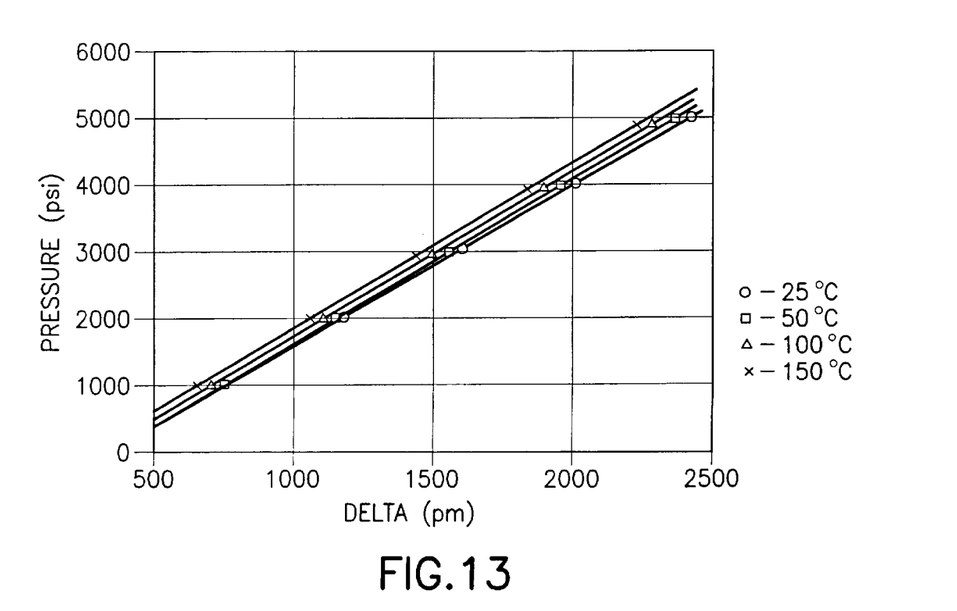
FIG. 13 is a plot illustrating the linear relationship between pressure and wavelength difference at a variety of temperatures.

Following the pressure measurements and error correlation described above, the prototype transducer was exposed to a constant pressure of approximately 2,000 psi (±20 psi) and subjected to changing temperature between approximately 25° C. and 145° C. The wavelengths of the high and low peaks were recorded for several temperatures in this range and the results are plotted in FIG. 12. As seen in FIG. 12, the difference in wavelength (Δnanometers) between the high peak and the low peak remains substantially unchanged throughout the temperature range. In addition, it will be appreciated that the data plotted in FIG. 12 can be used to correlate wavelengths with temperature so that the transducer of the invention can be used to simultaneously measure pressure and temperature.

The results shown in FIG. 12 suggest that temperature has very little, but some affect on the accuracy of pressure measurements. The prototype transducer was therefore exposed to a range of pressures at several different temperatures in order to correlate the effects of temperature on pressure measurement. The slight differences in Δpm (picometers) between the peaks at different temperatures were plotted for changing pressures in FIG. 13 and found to be substantially linear with the difference being a relatively constant 2.6 psi/°C. This compares very favorably to a state of the art unenhanced single peak fiber optic grating pressure sensor which requires a 264 psi/°C. correction for temperature.

There have been described and illustrated herein several embodiments of methods and apparatus for measuring pressure and temperature with transversely loaded fiber optic sensors. While particular embodiments of the invention have been described, it is not intended that the invention be limited thereto, as it is intended that the invention be as broad in scope as the art will allow and that the specification be read likewise. Thus, it will be appreciated that various aspects of different embodiments can be utilized in conjunction with other embodiments of the invention. Also, while processing to determine pressure and temperature by locating spectral peaks was described, it will be appreciated that peak-related spectral locations could be utilized (e.g., centroids of peaks) instead of actual peaks. It will therefore be appreciated by those skilled in the art that yet other modifications could be made to the provided invention without deviating from its spirit and scope as so claimed.

What is claimed is:

1. A fiber optic transducer, comprising:
   a) a fiber optic having a core having at least one grating formed along at least one portion of said core; and
   b) mechanical structure coupled to said fiber optic core for converting pressure on said mechanical structure to transverse strain on said fiber optic core at said grating.

2. A fiber optic transducer according to claim 1, wherein:
   said mechanical structure includes a body with a piston disposed therein, a portion of said fiber optic having said grating being disposed in said body and being subjected to transverse strain by said piston.

3. A fiber optic transducer according to claim 2, wherein:
   said piston has a first end which is adjacent to said fiber optic and a second end and said mechanical structure further includes a flexible diaphragm adjacent to said second end of said piston.

4. A fiber optic transducer according to claim 3, wherein:
   said mechanical structure further includes a glass or quartz plate between said piston and said fiber optic.

5. A fiber optic transducer according to claim 3, wherein:
   said mechanical structure further includes a first glass or quartz plate between said piston and a first side of said fiber optic and a second glass or quartz plate adjacent a second side of said fiber optic.

6. A fiber optic transducer according to claim 4, wherein:
   said mechanical structure further includes an object of similar diameter to said fiber optic which is spaced from said fiber optic and between said first and second plates.

7. A fiber optic transducer according to claim 1, wherein:
   said mechanical structure includes a pair of rods and a flexible sheath, a portion of said fiber optic having said grating being disposed between said rods, and said rods being covered with said flexible sheath.

8. A fiber optic transducer according to claim 7, wherein:
   said rods are glass or quartz.

9. A fiber optic transducer according to claim 1, wherein:
   said mechanical structure defines a chamber having first and second walls contacting said fiber, wherein a portion of said fiber optic having said grating is disposed within said chamber.

10. A fiber optic transducer according to claim 9, wherein:
said mechanical structure is made of one of silicon, glass, and quartz.

11. A fiber optic transducer according to claim 9, wherein:
said mechanical structure is substantially symmetrical and together with said chamber defines two flexible diaphragms with said portion of said fiber optic having said grating being disposed between said diaphragms.

12. A fiber optic transducer according to claim 9, wherein:
said mechanical structure is substantially asymmetrical and together with said chamber defines a flexible diaphragm and a rigid backing with said portion of said fiber optic having said grating being disposed between said diaphragm and said backing.

13. A fiber optic transducer according to claim 9, wherein:
said mechanical structure comprises an elliptical tube.

14. A fiber optic transducer according to claim 13, wherein:
said elliptical tube is provided with a soft filling, and said portion of said fiber having said grating is disposed within said elliptical tube.

15. A fiber optic transducer according to claim 9, wherein:
said mechanical structure comprises a tube having a chamber having one of a rectangular and elliptical cross-section, wherein said portion of said fiber having said grating is disposed in said chamber.

16. A fiber optic transducer according to claim 15, wherein:
said fiber has a cross-section larger than said rectangular or elliptical cross-section such that said fiber is pre-loaded.

17. A fiber optic transducer according to claim 1, wherein:
said fiber optic is one of a side hole fiber optic, a birefringence fiber optic, and a polarization-maintaining fiber optic.

18. A fiber optic transducer according to claim 1, wherein:
said portion of said fiber having said grating has a hard, hermetic, substantially non-deforming coating in lieu of a jacket.

19. A fiber optic transducer according to claim 1, wherein:
said portion of said fiber having said grating has exposed cladding.

20. A fiber optic transducer according to claim 19, wherein:
said mechanical structure defines a chamber in which said portion of said fiber having said grating is disposed, and said chamber is provided with non-reactive gas and is sealed.

21. A fiber optic sensing system, comprising:
a) a light source;
b) a spectral analyzer; and
c) a fiber optic transducer including
  i) a fiber optic having a core with at least one grating formed along at least one portion thereof, and
  ii) pressure responsive means for converting pressure to transverse strain on said core at said grating, wherein said light source is arranged to direct light into said core and said spectral analyzer is arranged to detect light exiting said core.

22. A fiber optic sensing system according to claim 21, wherein:
said spectral analyzer detects a low wavelength peak and a high wavelength peak with the spacing between spectral locations related to the peaks being related to said pressure.

23. A fiber optic sensing system according to claim 21, wherein:
the spacing between the spectral locations related to the peaks is weakly affected by temperature.

24. A fiber optic sensing system according to claim 20, wherein:
the spectral locations related to the peaks is related to temperature.

25. A method of measuring pressure, comprising:
a) optically coupling a fiber optic grating transducer to a light source;
b) directing light from the light source into the core of the fiber optic grating transducer;
c) optically coupling a spectral analyzer to the fiber optic grating transducer; and
d) measuring the spacing between spectral locations related to two spectral peaks detected by the spectral analyzer to determine the pressure ambient to the fiber optic grating transducer.

26. A method according to claim 25, further comprising:
e) determining the temperature of the fiber optic grating transducer by determining the spectral locations related to the two spectral peaks detected by the spectral analyzer.

27. A method according to claim 26, further comprising:
f) correcting the pressure determination based on the temperature determination.

28. A method according to claim 26, wherein:
the fiber optic grating transducer includes mechanical structure for converting pressure to transverse strain on the grating of the fiber optic.

29. A method according to claim 25, wherein:
said spectral locations related to said two spectral peaks are the absolute peak locations.

30. A method of measuring pressure, comprising:
a) obtaining a fiber optic grating transducer having mechanical means for converting pressure on the transducer to transverse strain on the core at the grating;
b) optically coupling the fiber optic grating transducer to a light source;
c) directing light from the light source into the core of the fiber optic grating transducer;
d) optically coupling a spectral analyzer to the fiber optic grating transducer; and
e) measuring the separation of two spectral locations related to two spectral peaks detected by the spectral analyzer to determine the pressure on the fiber optic grating transducer.

31. A method according to claim 30, further comprising:
f) determining the temperature of the fiber optic grating transducer by measuring the wavelengths of the spectral locations related to the two spectral peaks detected by the spectral analyzer.

32. A method according to claim 31, further comprising:
g) correcting the pressure determination based on the temperature determination.

* * * * *